United States Patent [19]
Lieber

[11] 4,161,130
[45] Jul. 17, 1979

[54] BODY FOR BASS GUITAR

[76] Inventor: Thomas G. Lieber, 9 E. Valley Stream Blvd., Valley Stream, N.Y. 11580

[21] Appl. No.: 854,273

[22] Filed: Nov. 23, 1977

[51] Int. Cl.[2] .............................................. G01D 1/08
[52] U.S. Cl. .......................................... 84/267; 84/291; 84/452 R
[58] Field of Search ................. 84/267, 268, 291, 292, 84/452 R, 452 P; D56/1 A

[56] References Cited

U.S. PATENT DOCUMENTS

| | | | |
|---|---|---|---|
| D. 74,766 | 3/1928 | Turturro | D56/1 A |
| 3,091,150 | 5/1963 | Sceusa | 84/267 X |
| 3,474,697 | 10/1969 | Kaman | 84/267 |
| 3,880,040 | 4/1975 | Kaman | 84/291 |

FOREIGN PATENT DOCUMENTS

| | | | |
|---|---|---|---|
| 2312766 | 9/1974 | Fed. Rep. of Germany | 84/291 |

*Primary Examiner*—John Gonzales
*Attorney, Agent, or Firm*—J. Michael Rosso

[57] ABSTRACT

A bowl-shaped body formed in a single piece of graphite, fiberglass or impregnated fabric and having a waist separating a smaller upper bowl portion from a larger lower bowl portion. The lower bowl portion has a circular bout and is substantially deeper than the upper bowl portion. Preferably, the upper bowl portion also has a cutaway portion adjacent the fretboard, for fingering at the higher positions, and a more deeply curving waist portion on the same side to allow the guitar to be more easily held during playing.

1 Claim, 6 Drawing Figures

BODY FOR BASS GUITAR

BACKGROUND OF THE INVENTION

This invention relates to four and eight string bass guitars, and more particularly to a bass guitar having a bowl-shaped body.

Guitars have been constructed for a variety of materials, including wood and plastic, and according to a variety of sizes, such as the traditional shape with an inwardly curving waist, as well as the pear shape characteristic of lutes. Similarly, guitars employing bowl-shaped bodies have long been available.

More recently, as disclosed in U.S. Pat. No. 3,474,697, guitars have been constructed using both a bowl-shaped body and plastic and other non-typical construction materials. However, as to four string or 8 string bass guitars, problems as to size, shape, and acoustical properties have remained. That is, bass guitars have presented special problems, both as to playability and acoustical characteristics, such as resonance, because of their substantially larger square-box size, being made of wood sides and back. As a result, presently available bass guitars have been restricted to conventional guitar shapes and materials.

SUMMARY OF INVENTION

In accordance with this invention there is provided a bass guitar constructed in a single piece of graphite, fiberglass, or impregnated fabric in a continuous layer of substantially uniform thickness. A waist portion separates a smaller upper bowl portion from a larger lower bowl portion, the lower bowl portion having a circular bout and a substantially greater depth than the upper bowl portion to allow the larger portion of air space to be in the lower bowl, with the sides of the body curving downwardly to meet the bottom in a continuously smooth surface.

It is a primary object of this invention to achieve improved resonance in bass guitars by means of an improved bowl-shaped body defining a large interior air space disposed next to a substantially smaller air space.

It is another object of this invention to provide a bass guitar which can be comfortably held as it is being played.

It is yet another object of this invention to provide a bowl-shaped body which can be used with either acoustic or amplified bass guitars to achieve improved resonance and playability.

DESCRIPTION OF PREFERRED EMBODIMENTS

Figure 1:
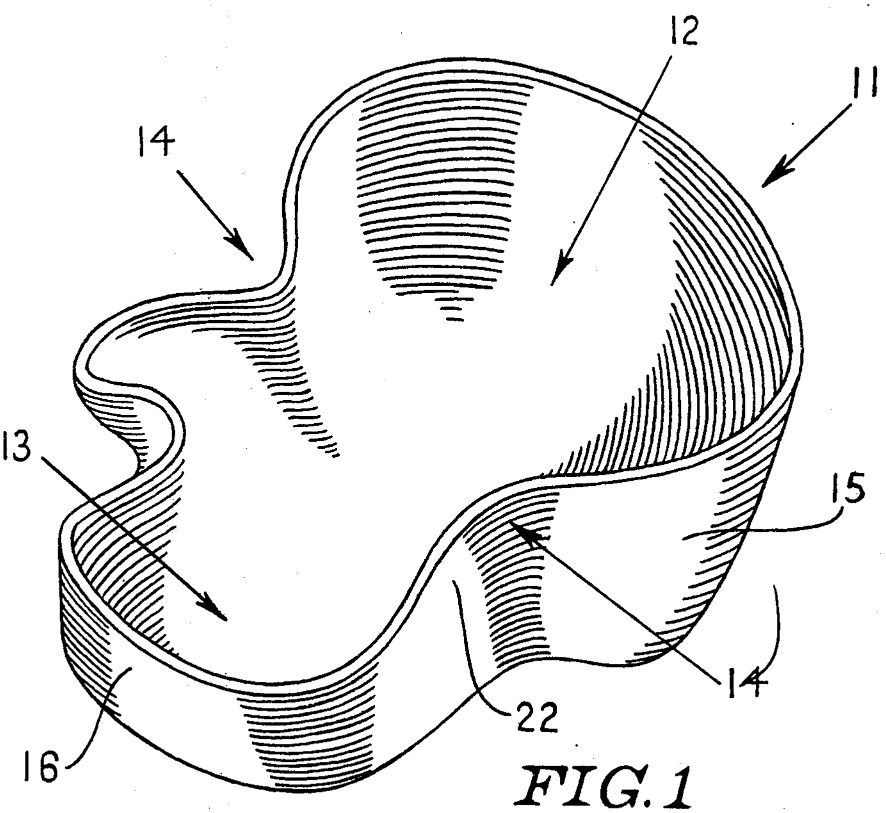
FIG. 1 is a perspective view of the bowl-shaped body of this invention.

As shown in FIG. 1, bowl-shaped body 11 is formed in one piece and has lower bowl portion 12 and upper bowl portion 13 separated by waist 14. The sides 15 of the bowl-shaped body 11 slope downwardly in a gradual curve and also merge smoothly where the lower bowl portion flows into the upper bowl portion at waist 14.

The sides 15 are perpendicular to the top of the body at two areas of the body, namely at the front 16 of the upper bowl portion, and at the side 22 of the waist 14. All other surfaces taper downwardly to the center of the bowl, causing the interior of the bowl to concentrate sound vibrations such that they flow outwardly from the sides until they escape through the sound hole.

The use of upper and lower bowl portions in accordance with this invention makes for the most advantageous concentration of interior space, not only with respect to playability but also as to acoustical properties. Surprisingly, the use of the substantially deeper lower bowl portion produces greatly improved resonance in bass guitars.

Bowl-shaped body 11 is preferably constructed in one piece of graphite. The use of such material has yielded bass guitars having superior resonance. Various other materials can also be used in molding the bowl-shaped body, including fiberglass or impregnated fabric or A.B.S. plastics, as long as such materials can be formed into a continuous layer of substantially uniform thickness having sufficient strength for guitar construction.

Figure 2:
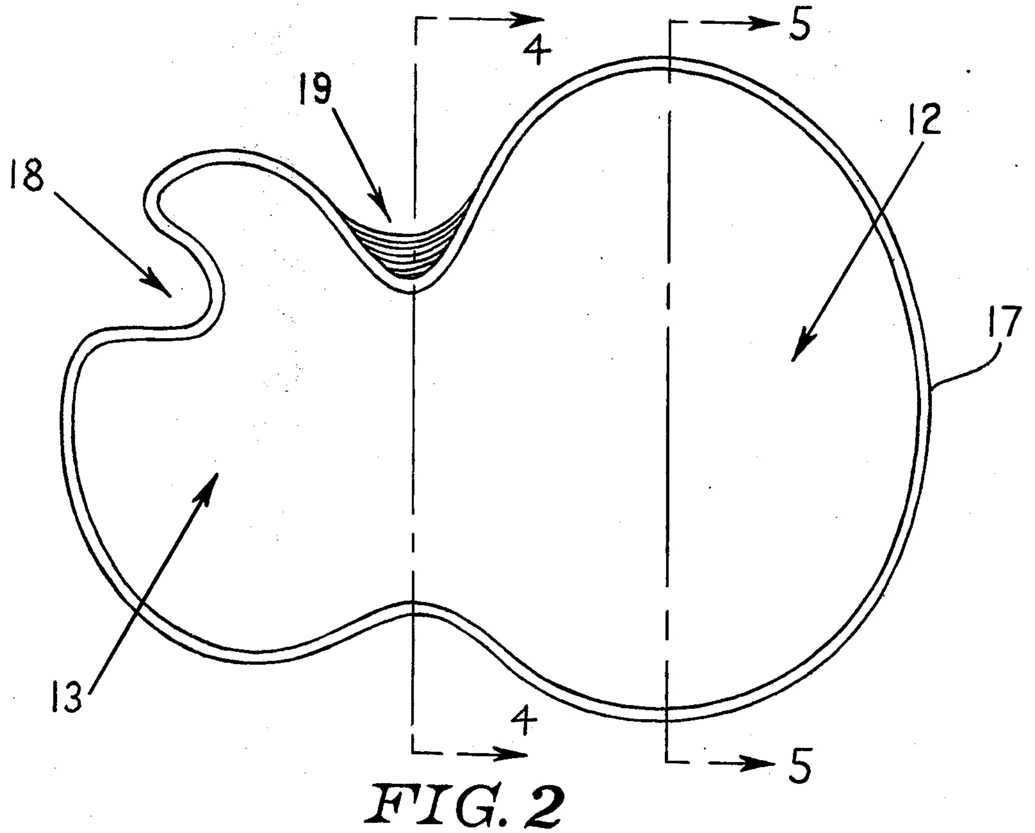
FIG. 2 is a plan view of the bowl-shaped body of FIG. 1.

As shown in FIG. 2, lower bowl portion 12 is substantially larger than upper bowl portion 13 and has a circular bout 17. A cutaway portion 18 is formed into the upper bowl portion 13 adjacent the point of attachment of the guitar neck, such cutaway portion allowing more ready access of the player's fingers to the higher positions on the fretboard. The cutaway portion as shown would be for a right handed guitar player, with an identical cutaway portion being formed into the opposite side of the upper bowl portion for a left-handed guitar player. Also, the side of waist 14 adjacent the cutaway portion 18 is formed with a deeper inward curve 19 and is otherwise molded such that the bowl-shaped body will rest snugly and yet comfortably on the player's leg as the guitar is being played.

Figure 3:
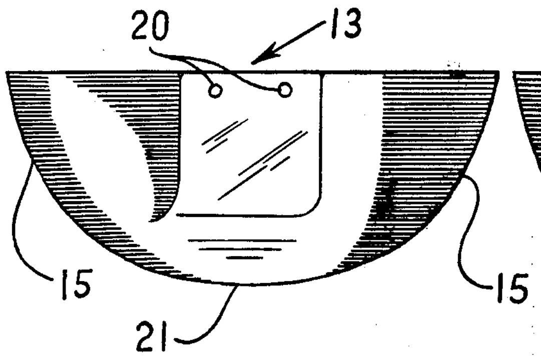
FIG. 3 is a front elevational view of the bowl-shaped body of FIG. 1, partly broken away.

FIG. 3 shows the upper bowl portion 13 with holes 20 for attachment of the neck. Sides 15 slope away from the top of the body to define the bowl shape of body portion 13.

Figure 4:
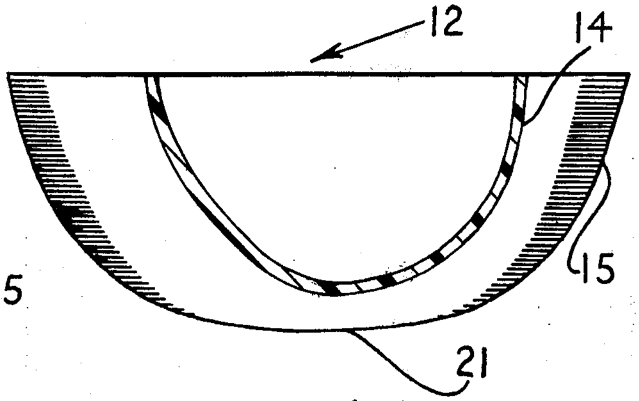
FIG. 4 is a sectional view along the line 4—4 of FIG. 2.
Figure 5:
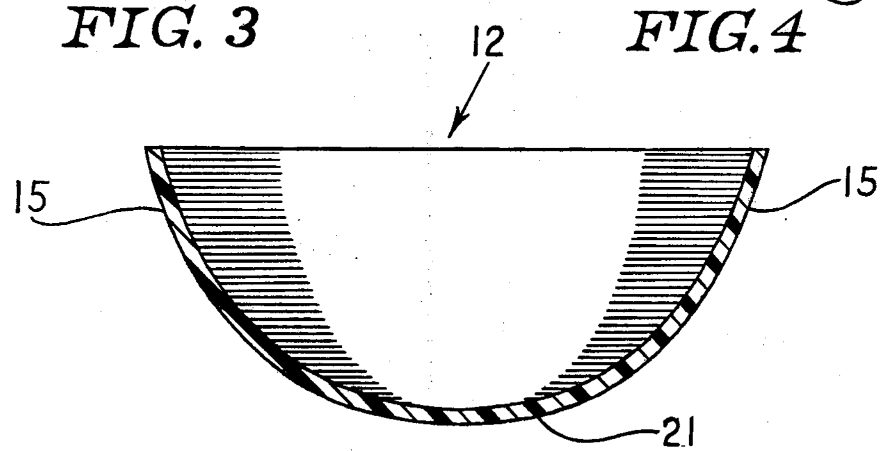
FIG. 5 is a sectional view along the line 5—5 of FIG. 2.
Figure 6:
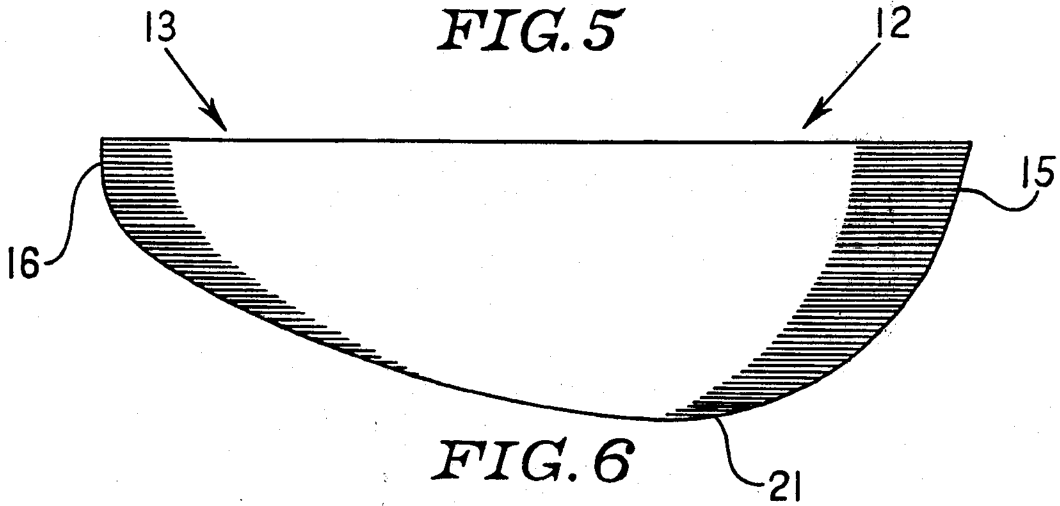
FIG. 6 is a side elevational view of the bowl-shaped body of FIG. 1.

As shown in FIGS. 4–6, the lower bowl portion 12 has a substantially greater depth than the upper bowl portion 13. Preferably, the depth of the lower bowl portion 12 is from about 7 to 12 inches depending on the resonance and harmonic frequency required. The width across such portion is from about 6½ to 22½ inches. The length of the entire body, including both upper and lower portions, can be from about 20 to 24 inches.

The sides 15 of bowl-shaped body 11 curve downwardly from all points around the top of the body, the sides merging smoothly with the bottom 21. As shown in FIG. 6, the side 16 of the upper bowl portion 13 is at first perpendicular and then curves steeply downward and gradually tapers to the bottom 21 of the larger bowl portion 12.

As noted above, the bowl-shaped body of this invention is preferably constructed of graphite, in a continuous layer of substantially uniform thickness of about 3/32 to ⅛ inches. Bass guitars having bowl-shaped bodies according to this invention, constructed of graphite, will exhibit not only superior resonance but also greatly improved playability.

I claim:

1. In a bass guitar, the improvement comprising a single piece bowl-shaped body constructed of graphite in a continuous layer of substantially uniform thickness, the body having a waist portion separating a smaller upper bowl portion from a larger lower bowl portion, the lower bowl portion having a circular bout and substantially greater depth than the upper bowl portion, with the sides of the body being perpendicular to the top along the front side and the waist area of the bass side, and with all other surfaces curving downwardly to meet the bottom in a continuously smooth surface.

* * * * *